United States Patent
Peynot et al.

(10) Patent No.: US 12,297,670 B2
(45) Date of Patent: *May 13, 2025

(54) DETECTION DEVICE AND DETECTION SYSTEM FOR ACTIVATING AT LEAST ONE FUNCTION OF AN APPARATUS, AND APPARATUS COMPRISING THE DETECTION SYSTEM

(71) Applicant: U-Shin Italia S.p.A., Pianezza (IT)

(72) Inventors: Thomas Peynot, Pianezza (IT); Anthony Guerin, Pianezza (IT); Frédéric Citron, Pianezza (IT); Dario Fimognari, Pianezza (IT)

(73) Assignee: U-Shin Italia S.p.A., Pianezza (IT)

( * ) Notice: Subject to any disclaimer, the term of this patent is extended or adjusted under 35 U.S.C. 154(b) by 273 days.

This patent is subject to a terminal disclaimer.

(21) Appl. No.: 17/950,517

(22) Filed: Sep. 22, 2022

(65) Prior Publication Data
US 2023/0090723 A1 Mar. 23, 2023

(30) Foreign Application Priority Data
Sep. 23, 2021 (EP) ..................................... 21198616

(51) Int. Cl.
*E05B 81/76* (2014.01)
*E05B 79/06* (2014.01)
(Continued)

(52) U.S. Cl.
CPC .............. *E05B 81/76* (2013.01); *E05B 79/06* (2013.01); *G01B 7/18* (2013.01)

(58) Field of Classification Search
CPC ......... G01L 3/102; G01L 3/105; G01L 3/104; G01L 5/221; G01L 3/109; G01L 5/06;
(Continued)

(56) References Cited

U.S. PATENT DOCUMENTS

| 5,447,074 | A | 9/1995 | Polaert et al. |
| 10,662,682 | B2 * | 5/2020 | Beck ........................ E05B 81/77 |

(Continued)

FOREIGN PATENT DOCUMENTS

| CN | 110670984 | 1/2020 |
| DE | 10137181 | 2/2003 |

(Continued)

OTHER PUBLICATIONS

European Search Report issued in corresponding EP Application 21198616, dated Feb. 17, 2022.

*Primary Examiner* — Andre J Allen
(74) *Attorney, Agent, or Firm* — Burris Law, PLLC

(57) ABSTRACT

A detection device is configured to activate at least one function of an apparatus, for example activating an electric lock of a vehicle's door, upon the detection of a force applied to an activation part of the apparatus. The apparatus includes a fixed part. The activation part is fixedly attached to the fixed part. The detection device includes a blade and at least one sensor. The blade includes a first bearing part configured to bear against the activation part and a second bearing part configured to bear against the fixed part. The at least one sensor is arranged on the blade and is configured to measure a deformation of the blade when a force is applied on the activation part and collect a deformation signal to be transmitted to a controller. The at least one sensor includes a first sensor arranged between the first and second bearing parts.

13 Claims, 10 Drawing Sheets

(51) Int. Cl.
*G01B 7/00* (2006.01)
*G01B 7/16* (2006.01)

(58) Field of Classification Search
CPC ... G01L 3/101; G01L 3/10; G01L 5/10; G01L 5/1627; G01L 25/003; G01L 3/12; G01L 3/108; G01L 5/24; G01L 1/205; G01L 3/103; G01L 3/1457; G01L 5/161; G01L 5/162; G01L 3/22; G01L 5/108; G01L 3/20; G01L 5/228; G01L 5/107; G01L 3/242; G01L 5/04; G01L 3/1435; G01L 5/0019; G01L 1/125; G01L 5/0042; G01L 5/106; G01L 1/16; G01L 1/20; G01L 5/226; G01L 1/22; G01L 1/2231; G01L 1/18; G01L 5/08; G01L 5/16; G01L 5/103; G01L 1/26; G01L 5/167; G01L 3/24; G01L 5/042; G01L 5/223; G01L 5/28; G01L 1/146; G01L 3/1464; G01L 1/2206; G01L 3/1471; G01L 3/18; G01L 3/00; G01L 5/102; G01L 5/165; G01L 3/04; G01L 5/045; G01L 3/08; G01L 5/00; G01L 3/1485; G01L 3/16; G01L 5/101; G01L 1/127; G01L 1/14; G01L 1/2287; G01L 1/2218; G01L 5/12; G01L 5/0061; G01L 3/02; G01L 5/13; G01L 3/14; G01L 3/1478; G01L 5/166; G01L 3/106; G01L 1/2243; G01L 3/1428; G01L 25/00; G01L 5/0004; G01L 1/02; G01L 1/142; G01L 5/0076; G01L 1/144; G01L 5/0038; G01L 1/00; G01L 1/04; G01L 5/0033; G01L 5/0009; G01L 3/1421; G01L 5/22; G01L 5/164; G01L 1/005; G01L 1/24; G01L 5/03; G01L 1/2262; G01L 3/1492; G01L 5/0052; G01L 5/0057; G01L 5/20; G01L 3/1407; G01L 1/2225; G01L 1/225; G01L 3/06; G01L 5/243; G01L 1/2293; G01L 1/255; G01L 5/0023; G01L 5/047; G01L 5/225; G01L 5/26; G01L 5/133; G01L 5/136; G01L 5/282; G01L 5/288; G01L 3/107; G01L 3/205; G01L 5/0085; G01L 5/105; G01L 1/148; G01L 1/162; G01L 3/245; G01L 5/009; G01L 1/10; G01L 1/2237; G01L 1/247; G01L 3/045; G01L 3/1414; G01L 1/165; G01L 1/246; G01L 1/2268; G01L 1/044; G01L 1/2256; G01L 5/0066; G01L 9/0055; G01L 9/0072; G01L 1/2281; G01L 5/168; G01L 5/169; G01L 9/0042; G01L 5/0028; G01L 5/0047; G01L 1/06; G01L 11/025; G01L 3/1442; G01L 5/0071; G01L 5/246; G01L 9/0022; G01L 1/08; G01L 1/12; G01L 1/122; G01L 5/163; G01L 1/103; G01L 1/106; G01L 3/26; G01L 5/008; G01L 1/248; G01L 5/14; G01L 9/0002; G01L 9/04; G01L 1/183; G01L 19/147; G01L 3/247; G01L 9/0051; G01L 9/008; G01L 1/25; G01L 9/007; G01L 9/16; G01L 1/042; G01L 1/241; G01L 17/00; G01L 19/0038; G01L 19/04; G01L 19/10; G01L 25/006; G01L 3/145; G01L 1/086; G01L 11/02; G01L 5/0095; G01L 5/173; G01L 9/0013; G01L 9/0098; G01L 9/08; G01L 9/12; G01L 1/048; G01L 11/00; G01L 11/04; G01L 15/00; G01L 17/005; G01L 19/00; G01L 19/0084; G01L 19/148; G01L 23/08; G01L 5/171; G01L 7/02; G01L 7/082; G01L 9/0019; G01L 9/0025; G01L 9/0029; G01L 9/0041; G01L 9/0092; G01L 9/02; G01L 1/2275; G01L 1/242; G01L 1/243; G01L 13/023; G01L 19/0007; G01L 19/08; G01L 19/086; G01L 19/149; G01L 23/10; G01L 23/26; G01L 27/005; G01L 7/00; G01L 9/0027; G01L 9/006; G01L 1/083; G01L 1/186; G01L 1/2212; G01L 1/245; G01L 11/004; G01L 13/02; G01L 13/025; G01L 19/0069; G01L 19/0092; G01L 19/02; G01L 19/0618; G01L 19/0645; G01L 19/14; G01L 2019/0053; G01L 21/00; G01L 23/02; G01L 23/085; G01L 23/14; G01L 23/20; G01L 23/223; G01L 27/002; G01L 7/084; G01L 7/10; G01L 7/163; G01L 7/166; G01L 7/22; G01L 9/0001; G01L 9/0005; G01L 9/0008; G01L 9/0014; G01L 9/002; G01L 9/0023; G01L 9/003; G01L 9/0052; G01L 9/0054; G01L 9/0075; G01L 9/065; G01L 9/10; G01L 1/046; G01L 11/006; G01L 11/008; G01L 11/06; G01L 19/003; G01L 19/0627; G01L 19/142; G01L 19/143; G01L 23/222; G01L 23/30; G01L 5/0014; G01L 9/00; G01L 9/0017; G01L 9/0033; G01L 9/0038; G01L 9/0044; G01L 9/0073; G01L 9/0077; G01L 9/0086; G01L 9/0095; G01L 9/045; G01L 9/06; G01L 9/14; G01L 6/10; G01L 15/0215; G01L 15/02; G01L 15/0245; G01L 5/049; G01L 5/0406; G01L 5/0409; G01L 5/0463; G01L 5/0481; G01L 15/021; G01L 15/0235; G01L 6/008; G01L 5/046; G01L 5/0469; G01L 15/022; G01L 5/0403; G01L 5/0412; G01L 5/0472; G01L 5/0415; G01L 53/0871; G01L 55/30; G01L 6/006; G01L 5/0457; G01L 5/0478; G01L 57/032; G01L 1/043; G01L 1/187; G01L 21/15; G01L 21/183; G01L 39/00; G01L 5/0487; G01L 5/0493; G01L 5/0835; G01L 5/30; G01L 55/305; G01L 6/001; G01L 6/002; G01L 6/007; G01L 6/08; G01L 65/00; G01L 65/10; G01L 1/065; G01L 15/024; G01L 5/006; G01L 5/043; G01L 6/00

USPC .............................................. 73/862–862.474

See application file for complete search history.

(56) References Cited

U.S. PATENT DOCUMENTS

| | | | |
|---|---|---|---|
| 2021/0122390 A1 | 4/2021 | Rea et al. | |
| 2023/0087064 A1* | 3/2023 | Guerin | E05B 81/16 |
| | | | 292/336.3 |
| 2023/0151649 A1* | 5/2023 | Mensch | G01V 3/088 |
| | | | 292/336.3 |

FOREIGN PATENT DOCUMENTS

| | | | |
|---|---|---|---|
| DE | 102016123724 | 6/2018 | |
| EP | 1816290 | 2/2010 | |
| EP | 2270455 A2 * | 1/2011 | G01L 1/18 |
| EP | 2674105 | 9/2016 | |

(56) References Cited

FOREIGN PATENT DOCUMENTS

| EP | 3812192 A1 | * | 4/2021 | ............. | B60K 35/00 |
| WO | WO-2019115804 A1 | * | 6/2019 | ............. | E05B 79/06 |
| WO | WO-2023193992 A1 | * | 10/2023 | ........... | H03K 17/965 |

* cited by examiner

DETECTION DEVICE AND DETECTION SYSTEM FOR ACTIVATING AT LEAST ONE FUNCTION OF AN APPARATUS, AND APPARATUS COMPRISING THE DETECTION SYSTEM

CROSS-REFERENCE TO RELATED APPLICATIONS

This application claims priority to and the benefit of European Application Number 21198616.1, filed on Sep. 23, 2021. The disclosures of the above applications are incorporated herein by reference.

FIELD

The present disclosure relates to a detection device for activating at least one function of an apparatus, for example for activating an electric lock of a vehicle's door.

BACKGROUND

The statements in this section merely provide background information related to the present disclosure and may not constitute prior art.

It is known from the state of the art that touch and/or pressure-sensitive sensors and proximity sensors can be provided for the opening of an electronic door lock, for example of a vehicle. Such sensors can be used, for example, on a door handle in order to detect contact with the door handle. Most of the pressure sensors are accessible from the outside of the handle in order to achieve a successful measurement. In response to a detection by the corresponding sensor, a vehicle function can be activated, for example activation of an electronic lock. Thus, for example, the door can be opened by touching the door handle of a door. However, this creates installation difficulties. For example, it is necessary to provide a seal to prevent against moisture ingress. Therefore, there is a need for a more reliable and/or more accurate and/or simpler option for activating vehicle functions. The teachings of the present disclosure address these and other issues with typical detection devices.

SUMMARY

This section provides a general summary of the disclosure and is not a comprehensive disclosure of its full scope or all of its features.

To this end, the present disclosure provides a detection device for activating at least one function of an apparatus, for example for activating an electric lock of a vehicle's door, upon the detection of a force applied to an activation part of the apparatus. The apparatus further includes a fixed part. The activation part is fixedly attached to the fixed part. The detection device includes a blade and at least one sensor. The blade includes a first bearing part configured to bear against the activation part and a second bearing part configured to bear against the fixed part. The at least one sensor is arranged on the blade between the first bearing part and the second bearing part, and configured to measure a deformation of the blade when a force is applied on the activation part and collect deformation signal to be transmitted to a controller.

The activation is configured to be activated by a user. In other words, the user may apply a force to the activation part when they intend to activate the function of the apparatus. Therefore, although the user may not be able to sense it, the activation part is movable relatively to the fixed part such that the blade is deformed.

The detection device according to the present disclosure is more accurate and reliable than typical detection devices. Indeed, as a result of the blade being arranged between the fixed part and the activation part, the blade is more sensitive to deformation induced by the force applied to the activation part by the user.

Moreover, the use of a blade allows measuring a deformation between the fixed part and the activation part more directly.

The detection device according to the present disclosure also improves the comfort of the user over typical detection devices. The mounting of the detection device on the apparatus is also easier than typical detection devices and, therefore, more cost effective.

Additionally, the use of a blade allows for easy replacement of the detection device, if needed.

The signal is representative of deformation data.

According to one form, the blade is sandwiched between the fixed part and the activation part.

When a user applies a force on the activation part, the first bearing part and the second bearing part are configured to be stressed in opposite directions.

In other words, when a user applies a force on the activation part, the force transmitted to the first bearing part may be in the same direction as the force applied by the user. Since, the second bearing part bears against the fixed part, the movement of the blade induced by the force transmitted to the first bearing part is hindered by the fixed part at the second bearing part of the blade. Therefore, the force transmitted to the second bearing part by the fixed part is opposed to the force transmitted to the first bearing part by the activation part.

In one form, the apparatus may be mounted on an assembly. For example, the assembly may be a door of a vehicle. The fixed part is the part of the apparatus configured to be integrally mounted on the assembly.

In yet another form, the function may be a function of an electric lock, such as an opening/closing or a locking/unlocking function.

According to still another form, the first bearing part may be secured to the activation part and/or the second bearing part may be secured to the fixed part.

In one form, the first bearing part may be firmly secured to the activation part and/or the second bearing part may be firmly secured to the fixed part. For example, the first bearing part may be attached to the activation part via a screw. For example, the second bearing part may be secured to the fixed part via a screw.

In another form, the first bearing part may be secured to the activation part by at least one overmolded securing portion or the second bearing part may be secured to the fixed part by at least one overmolded securing portion.

In yet another form, the blade may be positioned in the mold for manufacturing the activation part or the fixed part, when the fixed part or the activation part is manufactured.

In other words, the overmolded securing portion may be configured to secure the blade to the activation part or the overmolded securing portion may be configured to secure the blade to the fixed part.

In still another form, the overmolded securing portion is formed with the activation part or with the fixed part.

According to one form, the sensor may be positioned on one or the other face of the blade.

For example, the sensor may be positioned on a face of the blade configured to bear against the overmolded securing portion. According to still another form, this face of the blade may be facing the outside.

For example, the sensor may be positioned on the face of the blade opposite to the face configured to bear against the overmolded securing portion. In yet another form, this face of the blade may be facing the inside of the fixed part or the activation part, for example, an internal cavity of the fixed part or the activation part.

In still another form, the overmolded securing portion may protrudes from an external envelope of the fixed part or the activation part.

In one form, the blade may be made of metal material. For example, the blade may be made of steel.

In yet another form, the stiffness and elasticity of the blade is configured to be adapted such that the sensor is able to accurately measure the deformation of the blade.

In still another form, the width of a portion of the blade where the sensor is arranged may be between 0.5 and 1.5 mm.

According to one form, the width of a portion of the blade where the sensor is arranged may be between 0.6 and 1 mm.

In still another form, the width of a portion of the blade where the sensor is arranged may be substantially 0.8 mm.

According to yet another form, the sensor may be adhered on the blade. The mounting of the sensor on the blade is, therefore, simple and do not incur significant costs.

In still another form, the sensor may be a strain gage sensor.

In another form, the sensor may include one or several resistance(s).

In yet another form, the sensor may be a full-bridge strain gage.

In one form, the sensor may be a half-bridge strain gage.

In still another form, the detection device may include a housing.

According to one form, the housing may be configured to limit the deformation of the blade to a predetermined maximal value.

The risk of the blade being plastically deformed is therefore limited. In addition, the sensor is protected by the housing.

In one form, the housing may be configured to protect the sensor.

In still another form, the housing may be positioned over the face of the blade on which the sensor is arranged.

In yet another form, the housing may be made of plastic material.

According to another form, the sensor may be sandwiched between the blade and the housing.

In one form, the predetermined maximal value may correspond to a displacement included between 0.05 mm and 0.15 mm.

In still another form, the predetermined maximal value may correspond to a displacement included between 0.08 mm and 0.13 mm.

In one form, the predetermined maximal value may correspond to a displacement substantially of 0.105 mm.

In another form, the first bearing part may include a protruding portion configured to transmit the force applied to the activation part to the portion of the blade where the sensor is arranged.

In one form, the protruding portion may be in abutment against the activation part.

According to one form, the blade may include a third bearing part configured to bear against the fixed part, and a second sensor being arranged between the first bearing part and the third bearing part, the sensor being arranged between the first bearing part and the second bearing part being called the first sensor.

Therefore, the accuracy of the measurement of the deformation of the blade is improved.

In one form, the second sensor is configured to measure a deformation of the blade when a force is applied on the activation part and collect deformation signal to be transmitted to a controller.

In another form, the first sensor and the second sensor may each be half-bridge strain gage, whereby the two half-bridge strain gages are connected together to form a full-bridge strain gage.

In yet another form, the blade may include positioning elements configured to help positioning the blade on the activation part and/or the fixed part during a mounting phase.

According to another form, the present disclosure provides for a detection system for activating at least one function of an apparatus, for example for activating an electric lock of a vehicle's door, upon the detection of a force applied to an activation part of the apparatus. The apparatus further includes a fixed part. The activation part is fixedly attached to the fixed part. The detection system includes at least one detection device and a controller. The at least one detection device may be according to any one of the above mentioned features. The controller is configured to receive the deformation signal transmitted by the sensor of the at least one detection device and to activate at least one function of an apparatus when the deformation signal corresponds to predetermined criteria.

In one form, the predetermined criteria may correspond to a predetermined range of the numeral values of the signal and/or a predetermined range of the duration of a modification of the signal and/or a predetermined range of the speed of a modification of the signal.

In another form, the modification of the signal is to be understood as a rise or a decrease of the value of the signal relatively to a rest value of the signal, the rest value corresponding to the absence of deformation of the blade.

In yet another form, the limit values of the range of the signal value and/or the limit values of the duration range of a modification of the signal and/or the limit values of the speed range of a modification of the signal may be chosen in accordance with the aging of the detection device and/or the outside temperature.

In one form, these predetermined criteria are chosen such that the function of the apparatus is not activated by modifications of the signal that may be due to the aging of the detection device and/or a variation of the outside temperature.

According to yet another form, the present disclosure provides for an apparatus, for example a handle of a vehicle's door, including a fixed part, an activation part being fixedly attached to the fixed part, and at least one detection system according to the above mentioned features.

In one form, the apparatus may be a handle of a door, for example a vehicle's door, or any other apparatus such as a motorized flap.

In another form, the activation part may be fixedly attached to the fixed part in a first mounting area and in a second mounting area, a first detection device being arranged in the first mounting area and a second detection device being arranged in the second mounting area.

Further advantages and advantageous features of the door handle apparatus are disclosed in the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
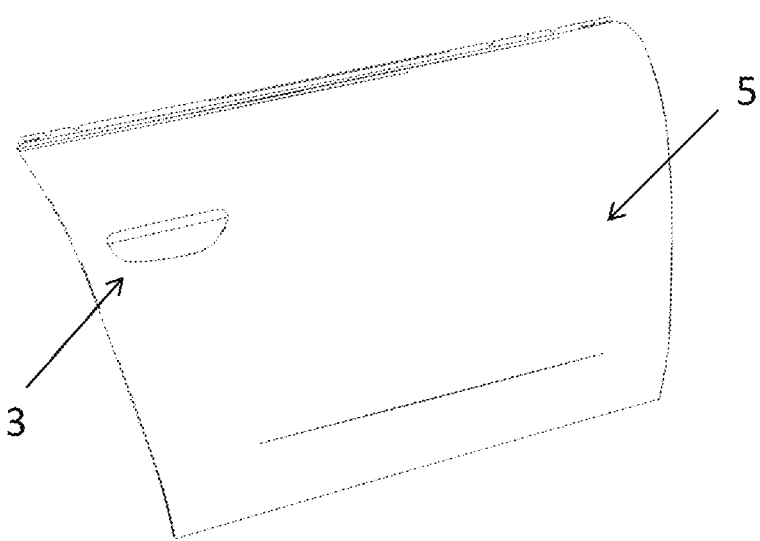
FIG. 1 is a perspective view of a door of a vehicle including a handle, according to the teachings of the present disclosure.
Figure 2:
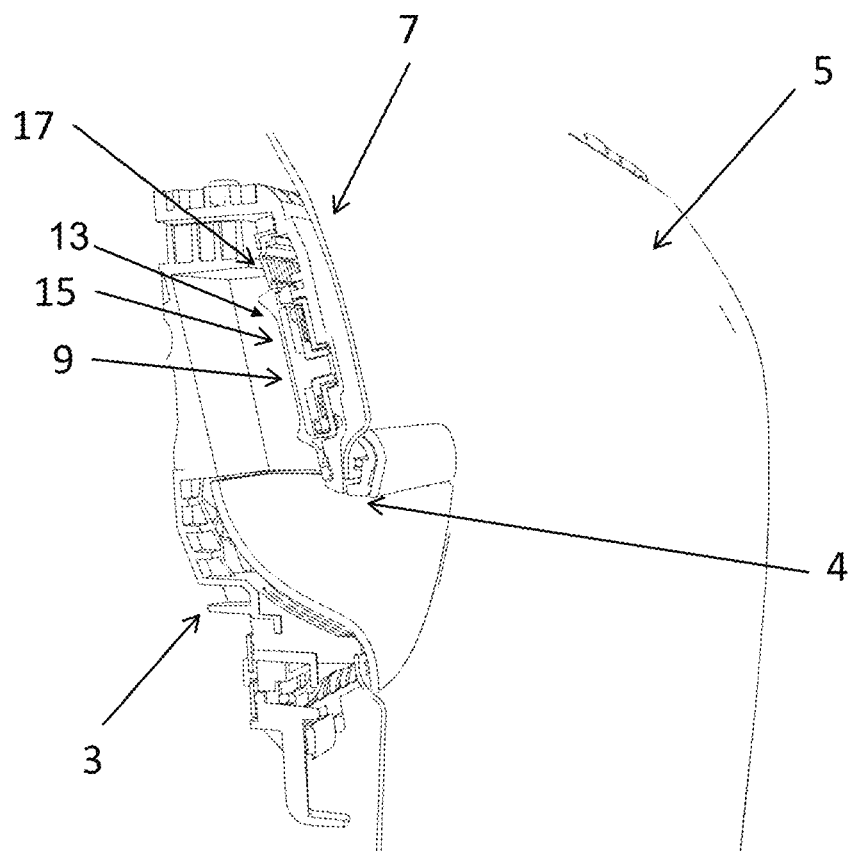
FIG. 2 is a perspective cross-sectional view of the door of FIG. 1, taken through the handle.
Figure 3:
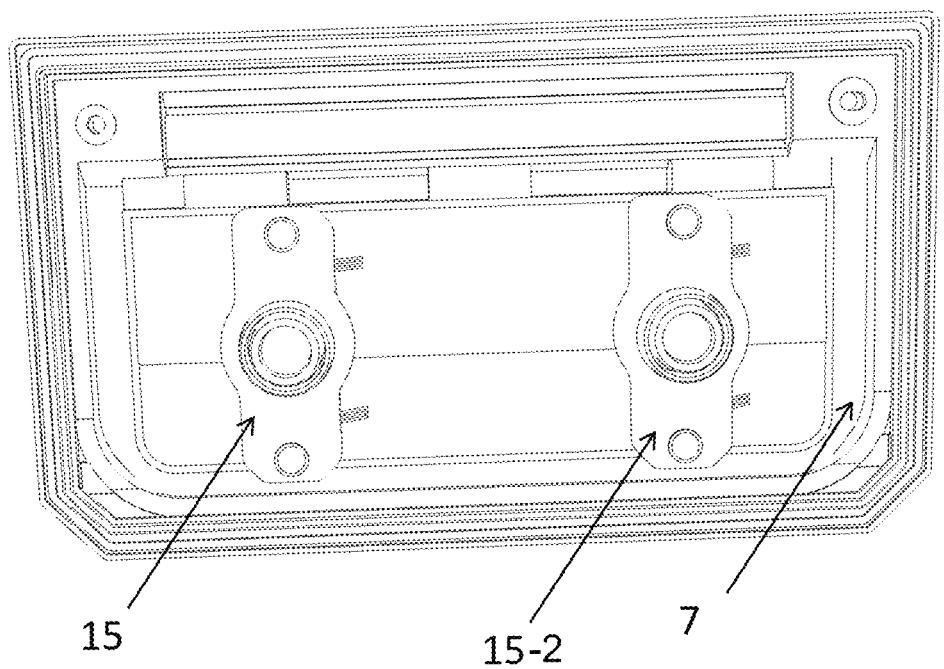
FIG. 3 is a rear view of the handle according of FIG. 1.
Figure 4:
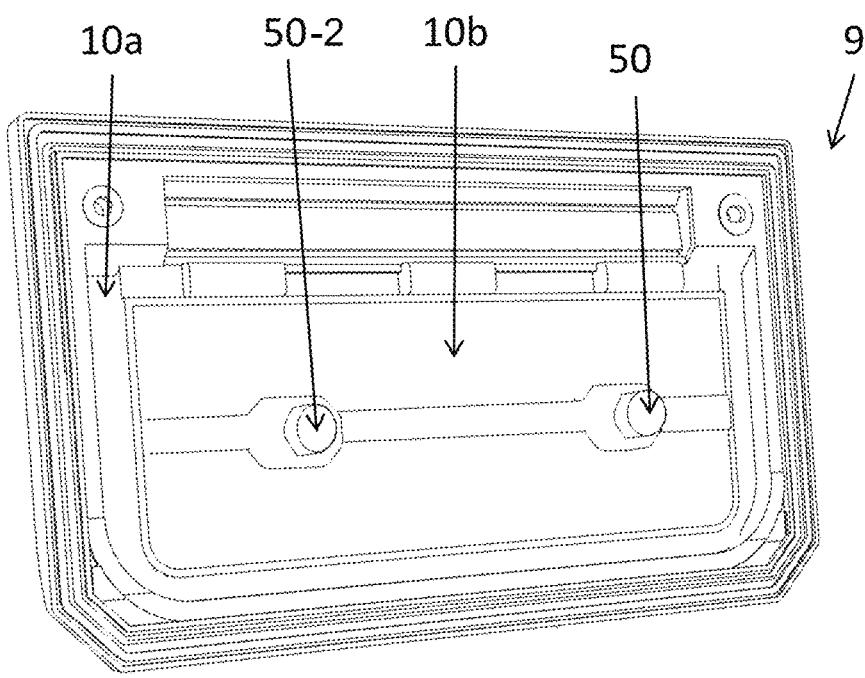
FIG. 4 is a perspective view of an activation part of the handle of FIG. 1.
Figure 5:
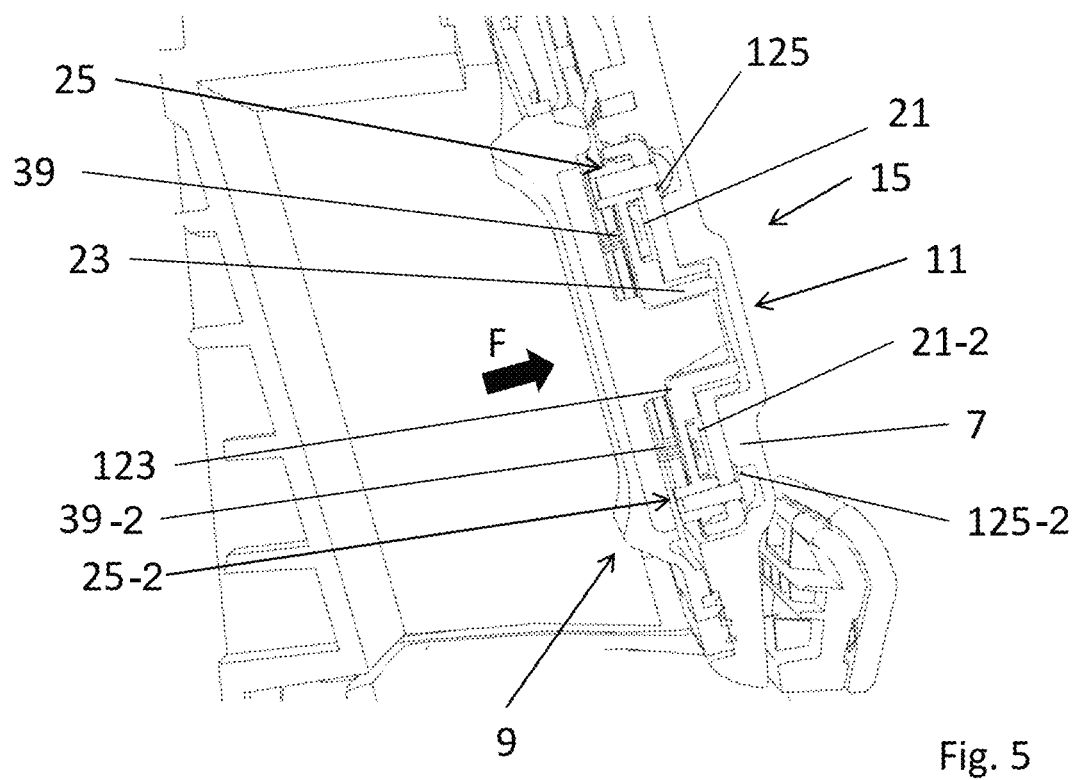
FIG. 5 is a cross-sectional view of a detection device of the door of FIG. 1, mounted on the handle, according to the teachings of the present disclosure.
Figure 6:
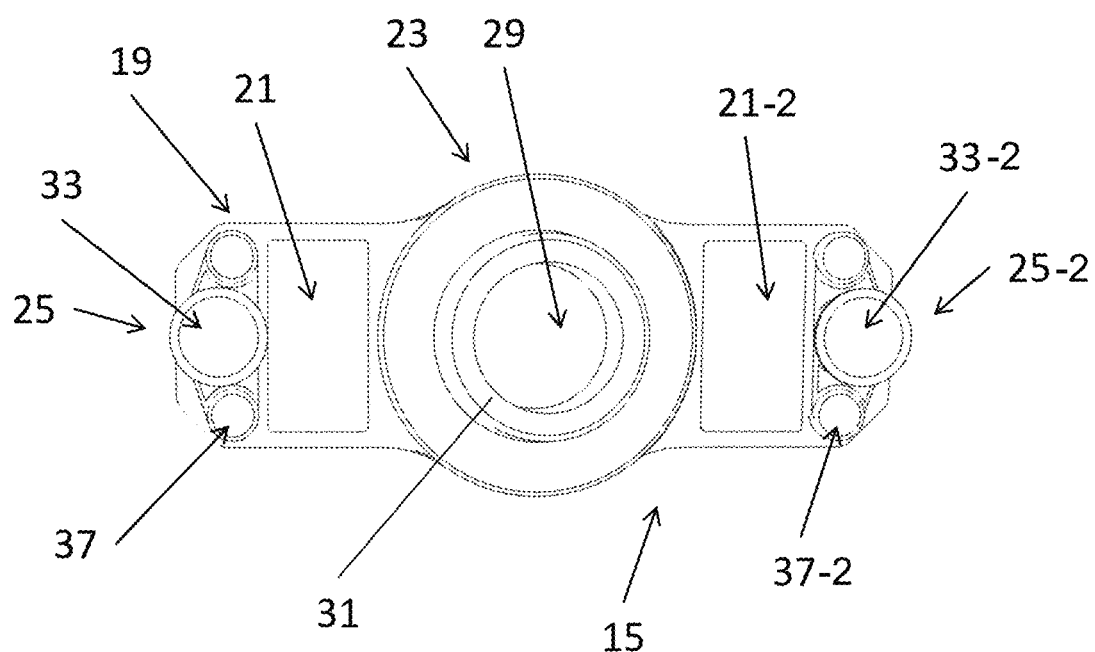
FIG. 6 is a top view of a blade of the detection device of FIG. 5.
Figure 7:
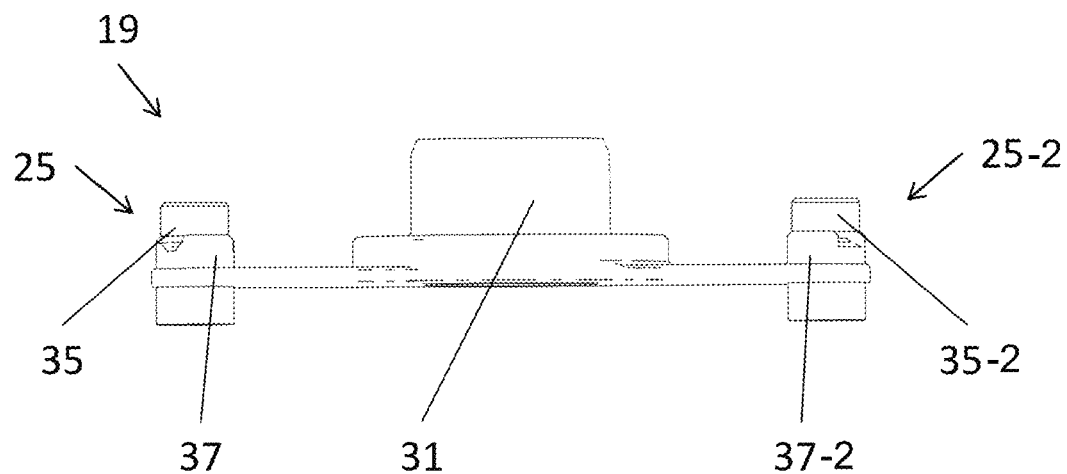
FIG. 7 is a side view of the blade of the detection device of FIG. 6.
Figure 8:
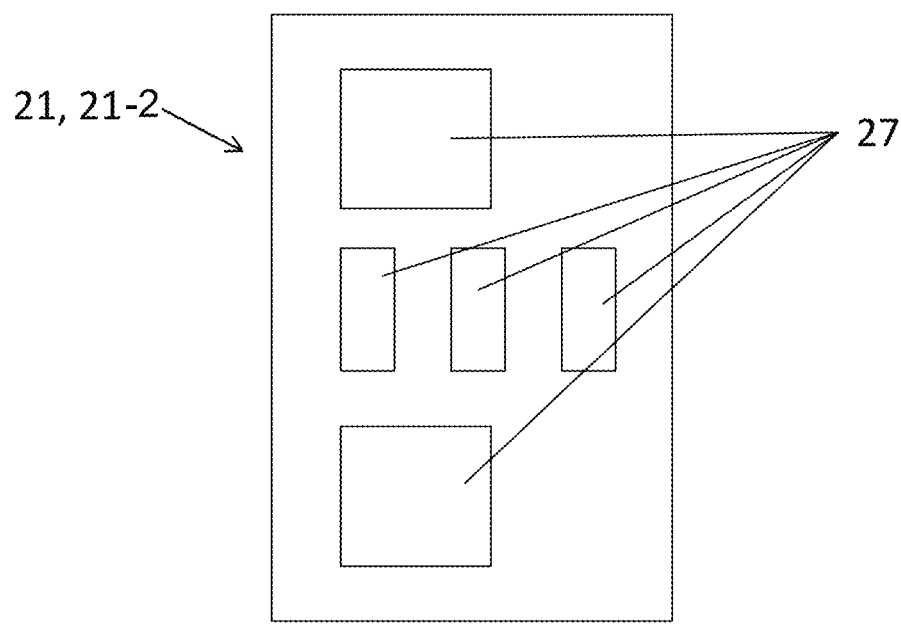
FIG. 8 is a schematic view of a sensor of the detection device of FIG. 5.
Figure 9:
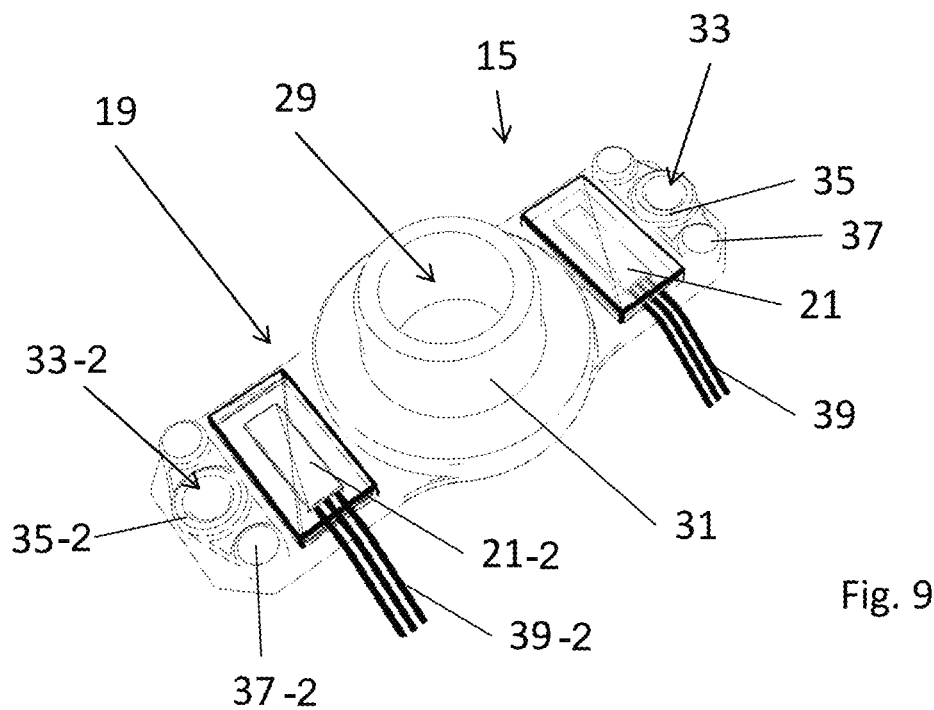
FIG. 9 is a perspective view of the detection device of FIG. 5, illustrated with the blade of FIG. 6 and first and second sensors in accordance with the teachings of the present disclosure.
Figure 10:
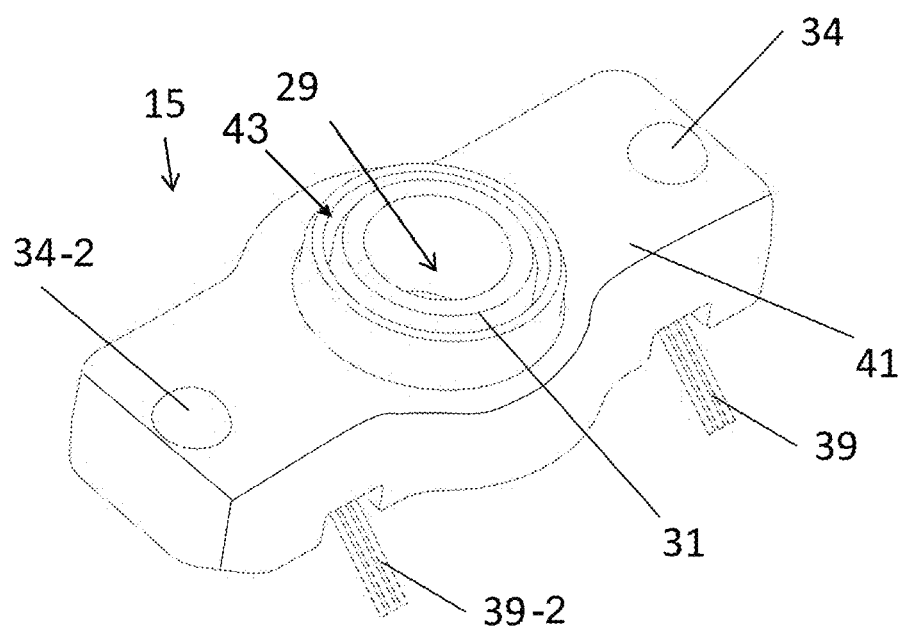
FIG. 10 is a top perspective view of the detection device of FIG. 6, illustrated with a housing arranged on the blade in accordance with the teachings of the present disclosure.
Figure 11:
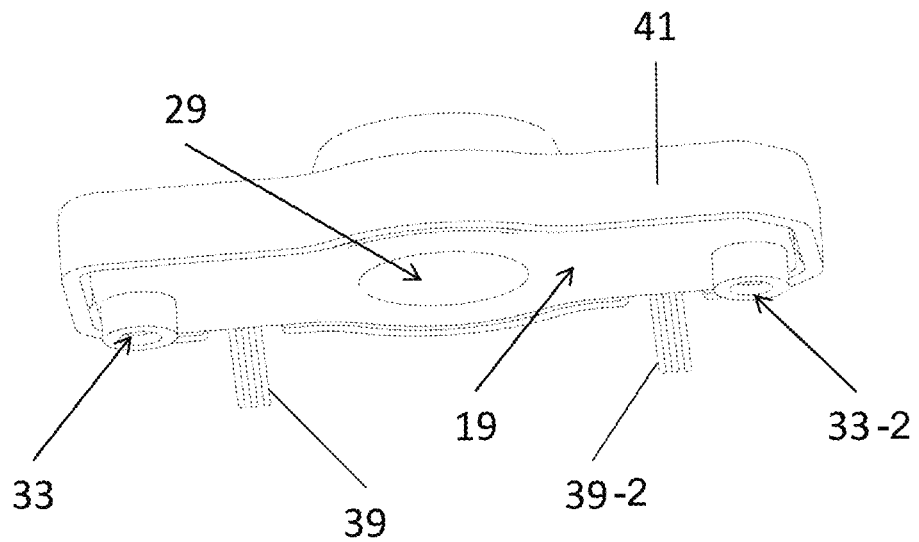
FIG. 11 is a bottom perspective view of the detection device with the housing of FIG. 10.
Figure 12:
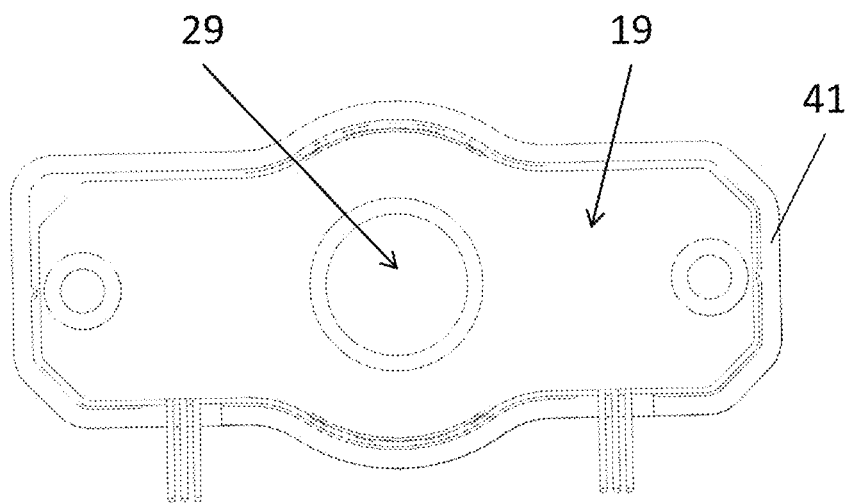
FIG. 12 is a bottom view of the detection device with the housing of FIG. 11.
Figure 13:
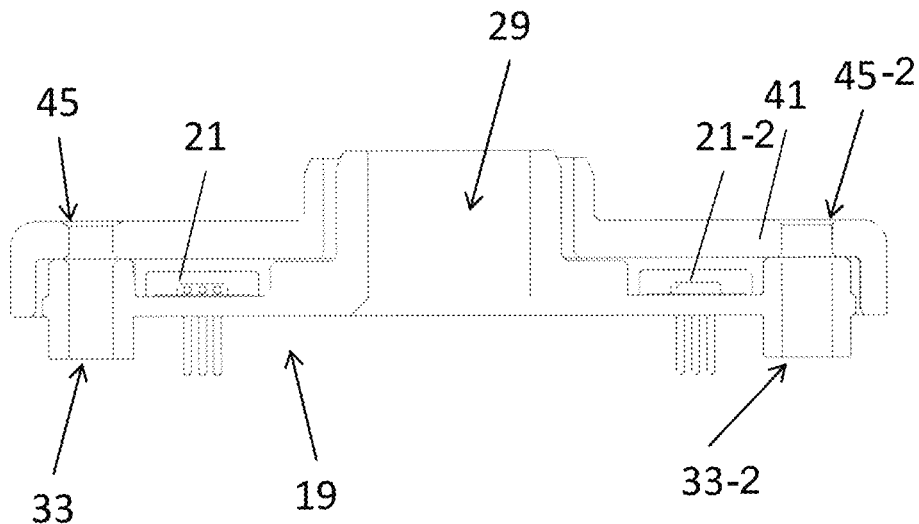
FIG. 13 is a cross-sectional view of the detection device with the housing of FIG. 10.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, positioning terms such as front, back, left, right, etc., refer to an orthogonal basis including the following three directions: front-back, left-right and top-bottom. In this description, theses three directions correspond to the usual directions attached to the motor vehicle. However, in other forms in accordance with the teachings of the present disclosure, the directions front-back, left-right and top-bottom could be any set of arbitrary directions forming an orthogonal basis.

FIGS. 1 to 5 show a first form of an apparatus according to the present disclosure, wherein the apparatus is a handle 3 of a vehicle's door 5. In another form, the apparatus may be a motorized flap for example. In this example, the handle 3 is formed by a recess 4 in the outdoor wall of the door 5.

The handle 3 includes a fixed part 7, corresponding to a bracket of the handle 3, integral with the door 5 of the vehicle, and an activation part 9, corresponding to a paddle of the handle 3. The activation part 9 is firmly attached to the fixed part 7, for example via laser welding. The activation part 9 may be in polycarbonate, for example in transparent polycarbonate. The activation part 9 may include a rubber part 10a, overmolded on a polycarbonate part 10b. The activation part 9 is configured to be activated by a user. The activation part 9 is movable relatively to the fixed part 7 at a scale wherein the movement of the activation part 9 is not detectable by the user. In other words, when pulling or pushing the activation part 9, the user feels that the activation part 9 is fixedly attached to the fixed part 7 even though the activation part 9 slightly moves.

The handle 3 further includes one detection system 13 configured to activate at least one function of the handle 3 upon the detection of a force applied to the activation part 9 by the user. The function may be a function of an electric lock of the vehicle's door 5, such as an opening/closing or a locking/unlocking function. The detection system 13 includes, in this example, a first detection device 15, a second detection device 15-2 and a controller 17. The controller 17 may be positioned in the fixed part 7 or in the vehicle's door 5 for example.

The first detection device 15 is described in the following description. The second detection device 15-2 is similar to the first detection device 15. As such, the description of the first detection device 15 applies to the second detection device 15-2 and the first detection device 15 is referred to hereinafter generally as the detection device 15. The detection device 15 includes a blade 19. The detection device 15 includes a first sensor 21 and a second sensor 21-2 arranged on the blade 19 and configured to measure the deformation of the blade 19 when a force is applied to the activation part 9 and to transmit a deformation signal to the controller 17. Having two sensors 21, 21-2 improves the accuracy of the detection device 15.

FIGS. 6 to 13 show one form of the detection device 15. The blade 19 includes a first bearing part 23 configured to bear against the activation part 9, a second bearing part 25 and a third bearing part 25-2. The second bearing part 25 and the third bearing part 25-2 are configured to bear against the fixed part 7.

The first sensor 21 is configured to be arranged on the blade 19 between the first bearing part 23 and the second bearing part 25. The second sensor 21-2 is configured to be arranged on the blade 19 between the first bearing part 23 and the third bearing part 25-2.

The material and the thickness of the portions of the blade 19 where the first sensor 21 and the second sensor 21-2 are arranged are adapted such that the blade 19 deforms at these portions when the user applies a force on the activation part 9.

The force applied by the user causing deformation may be between 10 and 60 N. In one example, the force applied by the user causing deformation may be between 20 and 50 N.

For example, the thickness of the portion of the blade 19 where the first sensor 21 and the second sensor 21-2 are arranged is between 0.5 and 1 mm. In one example, the thickness of the portion of the blade 19 where the first sensor 21 and the second sensor 21-2 are arranged is substantially of 0.8 mm.

The blade 19 may be of metal material such as steel.

In this form, the first sensor 21 and the second sensor 21-2 are adhered on the blade 19. The first sensor 21 and the second sensor 21-2 may be fixed to the blade 19 by any other suitable means known by the skilled person.

In this form, the first sensor 21 and the second sensor 21-2 can each be a half-bridge strain gage sensor, whereby the two half-bridge strain gage sensors are connected together to form a full-bridge strain gage sensor. The first sensor 21 and second sensor 21-2 include several resistances 27.

The first sensor 21 and the second sensor 21-2 may have a thickness between 0.2 and 0.8 mm. In one example, the first sensor 21 and the second sensor 21-2 may have a thickness of 0.5 mm.

The first sensor 21 and the second sensor 21-2 may communicate with the controller 17 by wires 39, 39-2 respectively, or by any other suitable communication means.

In this form, the first bearing part 23 includes a first protruding portion 31 and a first hole 29 formed in the first protruding portion 31.

The second bearing part 25 includes a second protruding portion 35 and a second hole 33 formed in the second protruding portion 35. The third bearing part 25-2 includes a third protruding portion 35-2 and a third hole 33-2 formed in the third protruding portion 35-2.

The second bearing part 25 and the third bearing part 25-2 may also include positioning studs 37, 37-2 respectively configured to ease the positioning of the blade 19 during the mounting phase of the handle 3.

As shown on FIGS. 9 to 13, the detection device 15 may include a housing 41. The housing 41 is configured to limit the deformation of the blade 19 to a predetermined maximal value. In one form, the predetermined maximal value may correspond to a displacement substantially of 0.105 mm (±0.05 mm).

The first sensor 21 and the second sensor 21-2 are sandwiched between the blade 19 and the housing 41 and are, therefore, protected. The housing 41 may be made of plastic material.

The housing 41 covers the face of the blade 19 wherein the first sensor 21 and the second sensor 21-2 are arranged. The first sensor 21 and the second sensor 21-2 are arranged on the same face of the blade 19 in this form. The housing 41 also covers the sides of the blade 19.

The housing 41 includes a central hole 43 configured to be facing the first hole 29 of the first bearing part 23. The central hole 43 of the housing 41 and the first hole 29 of the first bearing part 23 of the blade 19 are concentric. In this form, the central hole 43 of the housing 41 is engaged around the first protruding portion 31 of the first bearing part 23.

The housing 41 includes a first side hole 45 configured to be facing the second hole 33. The housing 41 includes a second side hole 45-2 configured to be facing the third hole 33-2. The first side hole 45 and the second hole 33 are concentric in this form. The second side hole 45-2 and the third hole 33-2 are concentric in this form. The housing 41 may be secured to the blade via screws 34, 34-2.

In this form, the first bearing part 23 bears on a first bearing surface 123 of the activation part 9. The second bearing part 25 bears on a second bearing surface 125 of the fixed part 7. The third bearing part 25-2 bears on a third bearing surface 125-2 of the fixed part 7. The first bearing surface 123, the second bearing surface 125 and the third bearing surface 125-2 are substantially parallel. The first bearing surface 123 and the second bearing surface 125 are disposed in opposite directions. The first bearing surface 123 and the third bearing surface 125-2 are disposed in opposite directions. The second bearing surface 125 and the third bearing surface 125-2 are disposed in the same direction.

The blade 19 is therefore held between the first bearing surface 123 of the activation part 9 at the first bearing part 23 on one hand, and the second and third bearing surfaces 125, 125-2 of the fixed part 7, at the second and third bearing parts 25, 25-2 on the other hand. The activation part 9 may include positioning studs 50, 50-2, as depicted on FIG. 4, configured to cooperate with the first hole 29 of the first bearing part 23 of the blade 19 of each of the first detection device 15 and the second detection device 15-2. The positioning studs 50, 50-2 are thus configured to maintain the position of the first detection device 15, and the second detection device 15-2 relatively to the fixed part 7 and the activation part 9.

The first detection device 15 and the second detection device 15-2 are therefore sandwiched between the fixed part 7 and the activation part 9. The activation part 9 may be secured to the fixed part around both the first detection device 15 and the second detection device 15-2. For example, the activation part 9 may be laser welded to the fixed part 7.

When the user activates the activation part 9, i.e., applies a force F to the activation part 9, the first bearing surface 123 of the activation part 9 transmits the force to the blade 19 via the first bearing part 23.

On one hand, the force is transmitted to the second bearing part 25 via the portion of the blade 19 where the first sensor 21 is arranged. The movement of the blade 19 in the direction of the force F is then hindered by the second bearing surface 125 of the fixed part 7, which is facing in a direction opposite to the direction of the force F. Therefore, the blade 19 is configured to deform at the portion of the blade 19 where the first sensor 21 is arranged.

On the other hand, the force F is transmitted to the third bearing part 25-2 via the portion of the blade 19 where the second sensor 21-2 is arranged. The movement of the blade 19 in the direction of the force F is then hindered by the third bearing surface 125-2 of the fixed part 7, which is facing in the direction opposite to the direction of the force F. Therefore, the blade 19 is configured to deform at the portion of the blade 19 where the second sensor 21-2 is arranged.

The controller 17 is then configured to collect the deformation signal transmitted by the first sensor 21 and the second sensor 21-2 and to activate the at least one function of the handle 3 when the deformation signal corresponds to predetermined criteria.

The predetermined criteria may correspond to a predetermined range of the numeral values of the signal and/or a predetermined range of the duration of a modification of the signal and/or a predetermined range of the speed of a modification of the signal.

The modification of the signal is to be understood as a rise or a decrease of the value of the signal relative to a rest value of the signal. The rest value corresponds to the absence of deformation of the blade.

The limit values of the range of the signal value and/or the limit values of the duration range of a modification of the signal and/or the limit values of the speed range of a modification of the signal may be chosen in accordance with the aging of the detection device 15 and/or the outside temperature.

These predetermined criteria are chosen such that the function of the apparatus is not activated by modifications of the signal that may be due to the aging of the detection device 15 and/or a variation of the outside temperature.

The blade 19 may also be secured to the activation part 9 at the first bearing surface 123. In this case, the first hole 29 may be threaded and be attached to the first bearing surface 123 via a screw for example. The blade 19 may also be secured to the activation part 9 at the first bearing surface 123 by any other suitable means.

The blade 19 may also be secured to the fixed part 7 at the second bearing surface 125. In this case, the second hole 33 may be threaded and be attached to the second bearing surface 125 via a screw for example. The blade 19 may also be secured to the fixed part 7 at the second bearing surface 125 by any other suitable means.

The blade 19 may also be secured to the fixed part 7 at the third bearing surface 125-2. In this case, the third hole 33-2 may be threaded and be attached to the third bearing surface 125-2, via a screw for example. The blade 19 may also be secured to the fixed part 7 at the third bearing surface 125-2 by any other suitable means.

In this form, the first bearing part 23 bears against the activation part 9 and the second bearing part 25 and the third bearing part 25-2 bears against the fixed part 7. In another form, the first bearing part 23 may bear against the fixed part 7 and the second bearing part 25 and the third bearing part 25-2 may bear against the activation part 9.

Figure 14:
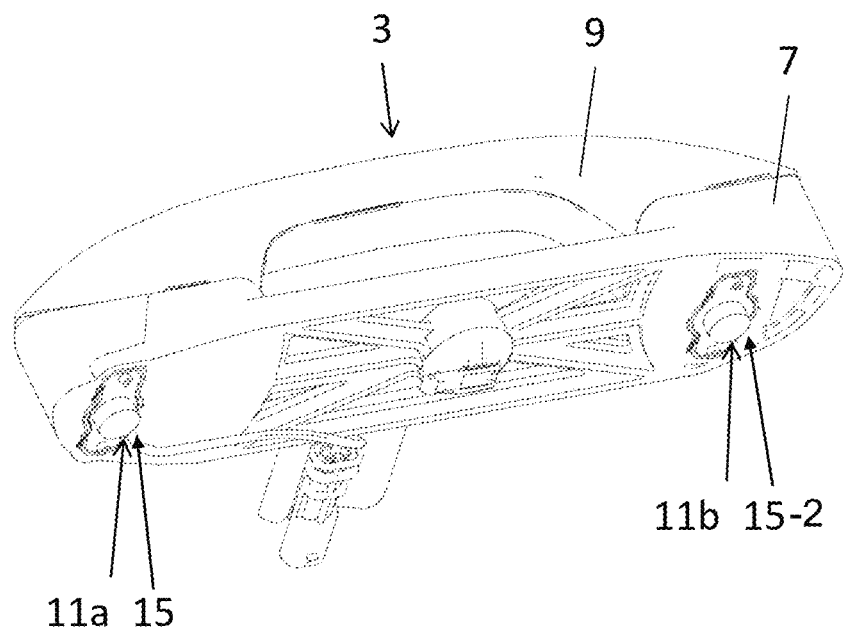
FIG. 14 is a perspective view of a handle and detection device for a door of a second form, according to the teachings of the present disclosure.
Figure 15:
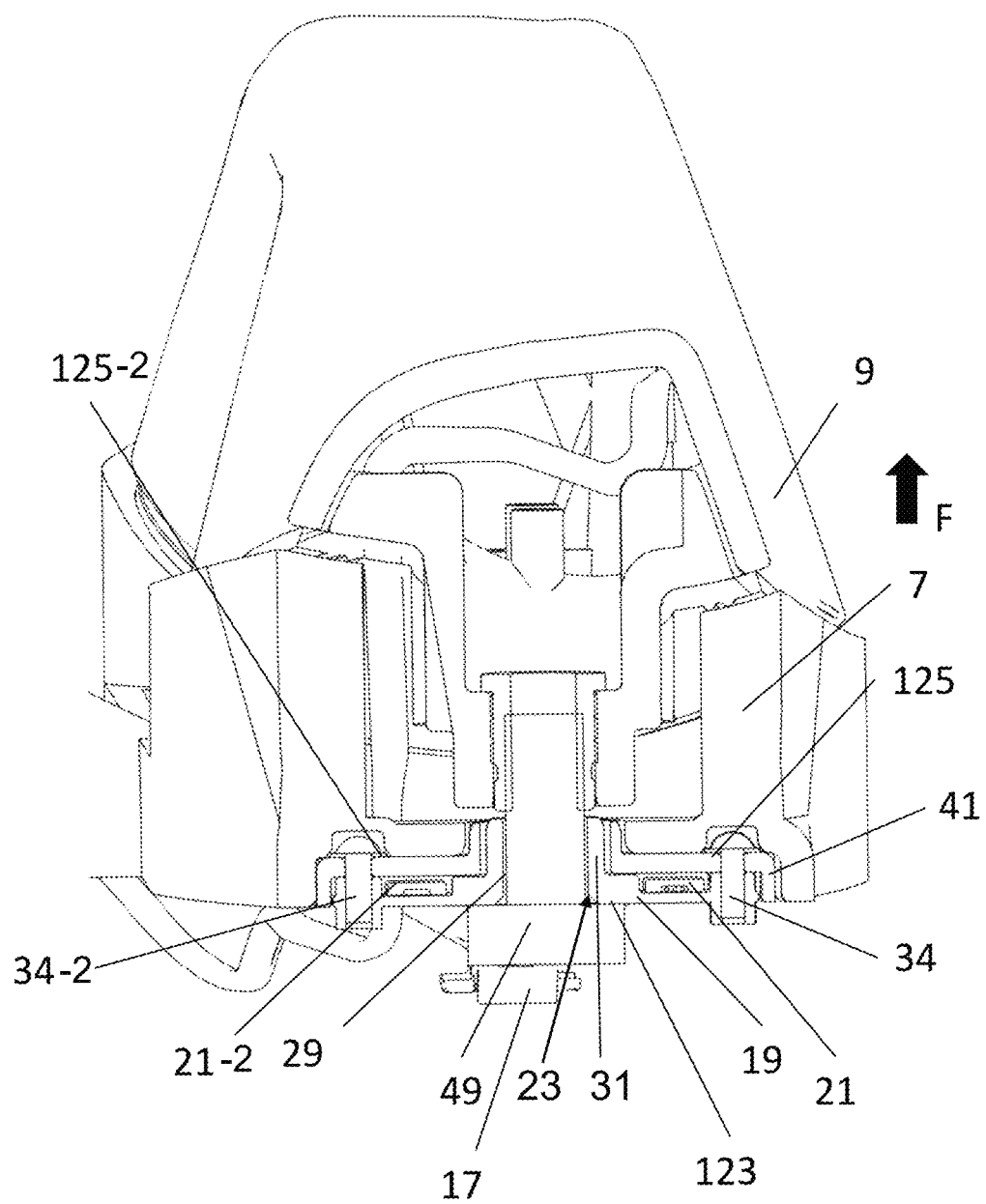
FIG. 15 is cross-sectional view of the detection device of FIG. 14.

Another form is represented in FIGS. 14 and 15. This form is similar to the other forms except as otherwise described or shown herein. Specifically, this form differs from the previous form in that the apparatus is the handle 3 of the vehicle's door wherein the activation part 9 is a gripping part, protruding from the outer wall of the door 5.

This form differs from the previous form in that the activation part 9 is mounted on the fixed part 7 at two mounting areas 11a, 11b. The detection system 13 includes the first detection device 15, arranged at the first mounting area 11a and the second detection device 15-2 arranged at the second mounting area 11b.

The detection system 13 includes one controller 17 for both the detection devices 15, 15-2. In another form, not specifically shown, the detection system 13 may include a first controller configured to communicate with the first detection device 15 and a second controller configured to communicate with the second detection device 15-2.

Returning to the example provided, this form differs from the first form in that an attachment element 49 of the activation part 9 is arranged through the first hole 29. The attachment element 49 includes the first bearing surface 123. In the form depicted on FIGS. 12 and 13, the attachment element 49 is a screw configured to cooperate with a threaded portion of the first hole 29.

In this form, the blade 19 is also secured to the fixed part 7 at the second bearing part 25 and the third bearing part 25-2 by the means of the screws 34, 34-2. The blade 19 may also be secured to the fixed part 7 at the second bearing part 25 and the third bearing part 25-2 by any other suitable means.

Figure 16:
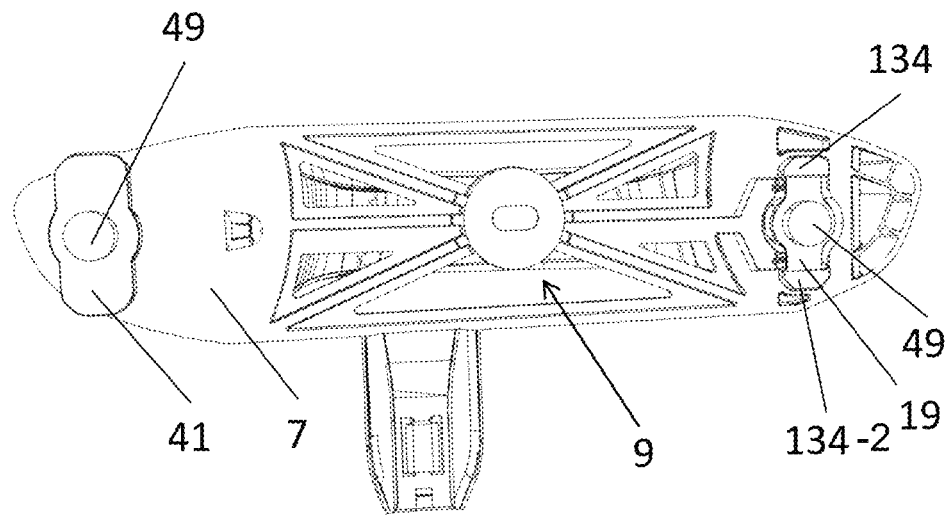
FIG. 16 is a perspective view of a handle and a detection device of a door of a third form, according to the teachings of the present disclosure.
Figure 17:
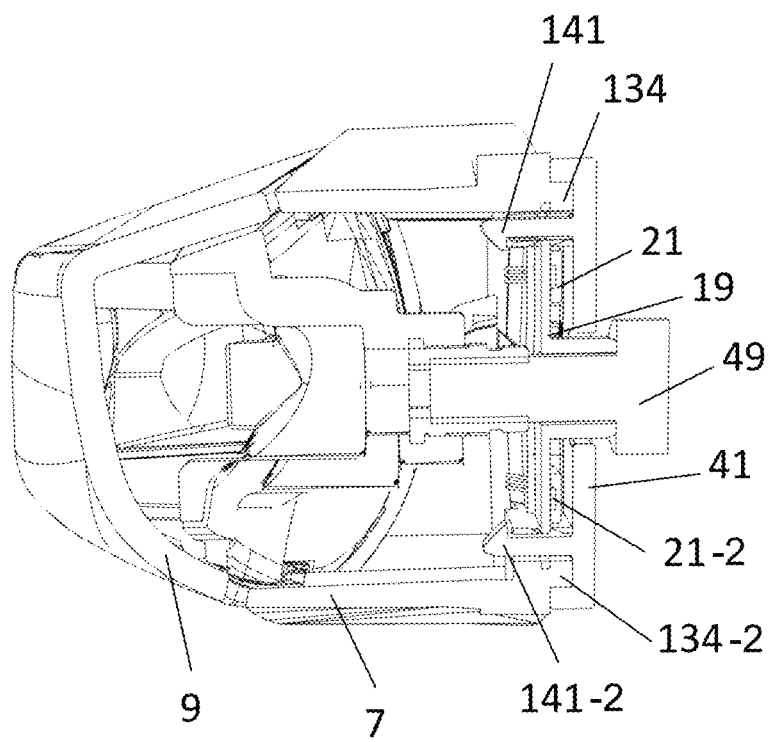
FIG. 17 is a cross-sectional view of the detection device of FIG. 16.
Figure 18:
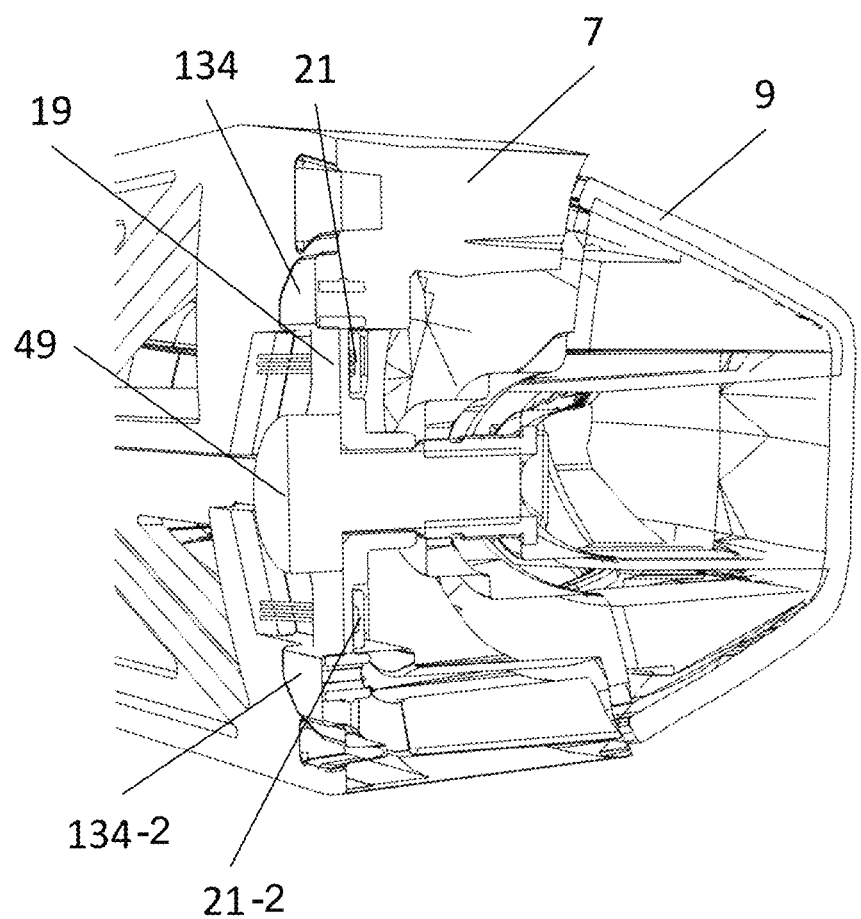
FIG. 18 is a cross-sectional view of a detection device of a fourth form, according to the teachings of the present disclosure.

Another form is represented in FIGS. 16 to 18. This form is similar to the other forms except as otherwise shown or described herein. Specifically, this form differs from the previously described forms in that the second bearing part 25 and the third bearing part 25-2 are secured to the fixed part 7 via overmolded securing portions 134, 134-2. In another example, the first bearing part 23 may be secured to the activation part via an overmolded securing portion.

The overmolded securing portions 134, 134-2 are formed with the fixed part 7. The overmolded securing portions 134, 134-2 may protrude from an external envelope of the fixed part 7.

The first sensor 21 and second sensor 21-2 may be positioned on one or the other face of the blade 19.

At the left side of FIG. 16 and in FIG. 17, the first sensor 21 and the second sensor 21-2 are positioned in a face of the blade 19 facing the outside of the fixed part 7.

The housing 41 is therefore arranged over the blade 19 to protect the first sensor 21 and the second sensor 21-2. Both the overmolded securing portions 134, 134-2 may include a hole, and the blade 19 may also include a hole at the second bearing part 25 and a hole at the third bearing part 25-2. For example, the hole of one overmolded securing portion 134 and the hole of the blade 19 at the second bearing part 25 are superposed. For example, the hole of the other overmolded securing portion 134-2 and the hole of the blade 19 at the third bearing part 25-2 are superposed. The housing 41 may include fixation organs 141, 141-2, for example hooks, configured to cooperate with the holes in order to secure the housing 41 over the blade 19.

At the right side of FIG. 16 and in FIG. 18, the first sensor 21 and the second sensor 21-2 are positioned in a face of the blade 19 facing the inside of the fixed part 7.

For example, the first sensor 21 and the second sensor 21-2 may be facing an internal cavity of the fixed part 7.

In this case, the housing 41 may not be needed.

It is to be understood that the present disclosure is not limited to the embodiments described above and illustrated in the drawings; rather, the skilled person will recognize that many changes and modifications may be made within the scope of the appended claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device comprising:
   an apparatus including an activation part and a fixed part, the activation part being fixedly attached to the fixed part; and
   at least one detection device configured to activate at least one function of the apparatus upon detection of a force applied on the activation part, the at least one detection device including:
      a blade including a first bearing part, a second bearing part, and a third bearing part, the first bearing part being configured to bear against the activation part, the second bearing part being configured to bear against the fixed part, the third bearing part being configured to bear against the fixed part; and
      at least one sensor arranged on the blade and configured to measure a deformation of the blade when the force is applied on the activation part and collect a deformation signal to be transmitted to a controller, the at least one sensor including a first sensor arranged between the first bearing part and the second bearing part and a second sensor arranged between the first bearing part and the third bearing part.

2. The device according to claim 1, wherein the first bearing part is secured to the activation part, or the second bearing part is secured to the fixed part, or the first bearing part is secured to the activation part and the second bearing part is secured to the fixed part.

3. The device according to claim 2, wherein at least one overmolded securing portion secures the first bearing part to the activation part or the second bearing part to the fixed part.

4. The device according to claim 1 wherein the blade is made of metal material.

5. The device according to claim 1 wherein the at least one sensor is adhered to the blade.

6. The device according to claim 1, wherein the at least one sensor is a strain gage sensor.

7. The device according to claim 6, wherein the at least one sensor is a full-bridge strain gage.

8. The device according to claim 6, wherein the at least one sensor is a half-bridge strain gage.

9. The device according to claim 1, further comprising a housing configured to limit the deformation of the blade to a predetermined maximal value.

10. The device according to claim 1, wherein the first bearing part includes a protruding portion configured to transmit the force applied on the activation part to a portion of the blade where the at least one sensor is arranged.

11. The device according to claim 1, further comprising the controller, wherein the controller is configured to receive the deformation signal transmitted by the at least one sensor and to activate at least one function of the apparatus when the deformation signal corresponds to predetermined criteria.

12. The device according to claim 1, wherein the apparatus is a handle of a door of a vehicle.

13. The device according to claim 1, wherein the activation part is fixedly attached to the fixed part in a first mounting area and in a second mounting area, wherein the at least one detection device includes a first detection device being arranged at the first mounting area and a second detection device being arranged at the second mounting area.

* * * * *